United States Patent
Oka et al.

(10) Patent No.: US 11,245,148 B2
(45) Date of Patent: Feb. 8, 2022

(54) NONAQUEOUS ELECTROLYTE SECONDARY BATTERY AND BATTERY MODULE

(71) Applicant: Panasonic Intellectual Property Management Co., Ltd., Osaka (JP)

(72) Inventors: Takuya Oka, Hyogo (JP); Hiromasa Yagi, Osaka (JP); Yuma Kamiyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 140 days.

(21) Appl. No.: 16/495,943

(22) PCT Filed: Feb. 9, 2018

(86) PCT No.: PCT/JP2018/004544
§ 371 (c)(1),
(2) Date: Sep. 20, 2019

(87) PCT Pub. No.: WO2018/179897
PCT Pub. Date: Oct. 4, 2018

(65) Prior Publication Data
US 2020/0144560 A1    May 7, 2020

(30) Foreign Application Priority Data
Mar. 29, 2017 (JP) .............................. JP2017-064954

(51) Int. Cl.
*H01M 50/124* (2021.01)
*H01M 50/10* (2021.01)
(Continued)

(52) U.S. Cl.
CPC ......... *H01M 50/124* (2021.01); *H01M 50/10* (2021.01); *H01M 50/103* (2021.01); *H01M 50/20* (2021.01); *H01M 50/209* (2021.01)

(58) Field of Classification Search
CPC ........ H01M 10/058; H01M 2/10; H01M 2/14; H01M 2/16; H01M 2/34; H01M 10/052; H01M 10/0585
See application file for complete search history.

(56) References Cited

U.S. PATENT DOCUMENTS

2009/0123833 A1   5/2009   Mao et al.
2016/0211507 A1*  7/2016   Sharma ............... H01M 4/0402

FOREIGN PATENT DOCUMENTS

JP   10-326627 A    12/1998
JP   2001-143759 A   5/2001
(Continued)

OTHER PUBLICATIONS

Thermosets and Composites Technical Information for Plastic Users, Michel Biron, pp. 149-151] (Year: 2003).*

(Continued)

*Primary Examiner* — Maria Laios
*Assistant Examiner* — Bartholomew A Hornsby
(74) *Attorney, Agent, or Firm* — Westerman, Hattori, Daniels & Adrian, LLP

(57) ABSTRACT

A nonaqueous electrolyte secondary battery according to an embodiment includes an electrode assembly, a nonaqueous electrolyte, and a prismatic battery case accommodating the electrode assembly and the nonaqueous electrolyte. The mass energy density of the secondary battery is not less than 200 Wh/kg. The nonaqueous electrolyte secondary battery further includes a non-cellular elastic sheet disposed between the electrode assembly and the battery case. The ratio (A/B) of the thickness (A) of the elastic sheet at 100%

(Continued)

SOC to the thickness (B) of the elastic sheet at 0% SOC is 0.05 to 0.3.

8 Claims, 2 Drawing Sheets

(51) Int. Cl.
*H01M 50/20* (2021.01)
*H01M 50/103* (2021.01)
*H01M 50/209* (2021.01)

(56) References Cited

FOREIGN PATENT DOCUMENTS

| | | |
|---|---|---|
| JP | 2009-533833 A | 9/2009 |
| JP | 2014-216086 A | 11/2014 |
| JP | 2014216086 A * | 11/2014 |
| JP | 2016-189301 A | 11/2016 |
| JP | 2017-76476 A | 4/2017 |
| WO | 2016-031501 A1 | 3/2016 |

OTHER PUBLICATIONS

Polyhedron Laboratories, Inc., EPDM Rubber Testing Services (Retrieved Mar. 31, 2021 from https://www.polyhedronlab.com/services/rubber-testing/epdm-rubber-testing.html) (Year: 2021).*
International Search Report dated Mar. 27, 2019, issued in counterpart Application No. PCT/JP2018/004544 (2 pages).

* cited by examiner

NONAQUEOUS ELECTROLYTE SECONDARY BATTERY AND BATTERY MODULE

TECHNICAL FIELD

The present disclosure relates to a nonaqueous electrolyte secondary battery and a battery module.

BACKGROUND ART

In nonaqueous electrolyte secondary batteries such as lithium ion batteries, electrode assemblies expand and shrink during charging and discharging. In particular, the expansion and shrinkage of electrode assemblies occurs to a large extent in high-capacity batteries. For example, Patent Literature 1 discloses a cylindrical battery which has a foam as a spacer disposed between the outer periphery of an electrode assembly and a battery case so as to leave a gap for letting the electrode assembly expand. According to Patent Literature 1, the battery has high capacity and high output yet attains good safety and excellent reliability by virtue of the gap.

CITATION LIST

Patent Literature

PTL 1: Japanese Published Unexamined Patent Application No. 2001-143759

SUMMARY OF INVENTION

In a prismatic battery with a prismatic battery case, an electrode assembly is weakly restrained compared to one in a cylindrical battery. It is therefore necessary that, for example, a predetermined force be applied to both sides of the battery case in the direction of electrode stacking so as to maintain the interelectrode distances in the electrode assembly constant. In this case, the expansion of the electrode assembly due to charging produces a stress that pushes the battery case outward, and also generates a reaction force that resists this stress.

Appropriate controlling of this reaction force is important to maintain good battery performance. In high-capacity batteries, unfortunately, the large volume change of an electrode assembly due to charging and discharging makes it difficult to control the reaction force in an appropriate range. If, for example, the reaction force is too high, an electrolytic solution is less accessible to interelectrode spaces and the battery reaction is sometimes inhibited. Further, facilitated occurrence of internal short-circuits is expected. If, on the other hand, the reaction force is too low, the battery reaction occurs nonuniformly to cause adverse results such as decreases in capacity and output, and deteriorations in cycle life.

An object of the present disclosure is that a prismatic nonaqueous electrolyte secondary battery with 200 Wh/kg or higher mass energy density receives an appropriately controlled amount of reaction force exerted on an electrode assembly and thereby attains a reduction in deteriorations in battery performance.

A nonaqueous electrolyte secondary battery according to an aspect of the present disclosure includes an electrode assembly including a positive electrode, a negative electrode and a separator, the positive electrode and the negative electrode being stacked together via the separator, a non-aqueous electrolyte, and a prismatic battery case accommodating the electrode assembly and the nonaqueous electrolyte, the mass energy density of the nonaqueous electrolyte secondary battery being not less than 200 Wh/kg. The nonaqueous electrolyte secondary battery further includes a non-cellular elastic sheet disposed between the electrode assembly and the battery case, and the ratio (A/B) of the thickness (A) of the elastic sheet at 100% SOC to the thickness (B) of the elastic sheet at 0% SOC is 0.05 to 0.3.

A battery module according to an aspect of the present disclosure includes a battery group including a plurality of the above nonaqueous electrolyte secondary batteries arranged along the direction of stacking of the positive electrode and the negative electrode, a plurality of spacers each disposed between each pair of the nonaqueous electrolyte secondary batteries adjacent to each other, and a pair of end plates that applies a pressure to the battery group from both sides of the battery group in the direction of stacking of the positive electrode and the negative electrode.

According to one aspect of the present disclosure, a prismatic nonaqueous electrolyte secondary battery with 200 Wh/kg or higher mass energy density receives an appropriately controlled amount of reaction force exerted on an electrode assembly and thereby attains good battery performance.

DESCRIPTION OF EMBODIMENTS

As mentioned earlier, high-capacity prismatic batteries having a mass energy density of not less than 200 Wh/kg encounter difficulties in being designed so that an appropriately controlled amount of reaction force will be exerted on their electrode assemblies. The present inventors carried out extensive studies on this problem, and have been successful in keeping the reaction force in an appropriate range even in high-capacity prismatic batteries by providing, between the electrode assembly and the battery case, a non-cellular, i.e., being not foamed, elastic sheet that can be deformed in a specific thickness range in accordance with the state of charge (SOC) of the battery. The elastic sheet is pressed and is elastically deformed to a degree in accordance with the stress generated by the expansion of the electrode assembly and thereby allows the stress to be eased appropriately.

In the nonaqueous electrolyte secondary battery of the present disclosure, the ratio (A/B) of the thickness (A) of the elastic sheet at 100% SOC to the thickness (B) of the elastic sheet at 0% SOC is controlled to 0.05 to 0.3. By this control, the reaction force exerted on the electrode assembly is maintained in an appropriate range. For example, 0.2 MPa or higher reaction force is ensured even in the fully discharged state, and thus it is possible to prevent problems such as the interelectrode distances being rendered nonuniform, and the electrodes being misaligned by vibrations. Further, the reaction force does not exceed 2.0 MPa even in the fully charged state, and thus it is possible to prevent problems such as the battery reaction being inhibited, and the occurrence of internal short-circuits.

The elastic sheet is a non-cellular sheet that negligibly absorbs or does not substantially absorb an electrolytic solution. If the elastic sheet is a porous foam, an electrolytic solution can move into and out of the sheet and, particularly when the electrolytic solution has a high viscosity, the elastic sheet becomes low in deformation response and may fail to control the reaction force in an appropriate range.

Hereinbelow, embodiments of the nonaqueous electrolyte secondary batteries and battery modules of the present disclosure will be described in detail. The drawings used in the description of the embodiments are schematic and may not correctly illustrate configurations such as the dimensional ratio of constituents. Specific configurations such as dimensional ratio should be estimated in consideration of the description given below.

Figure 1:
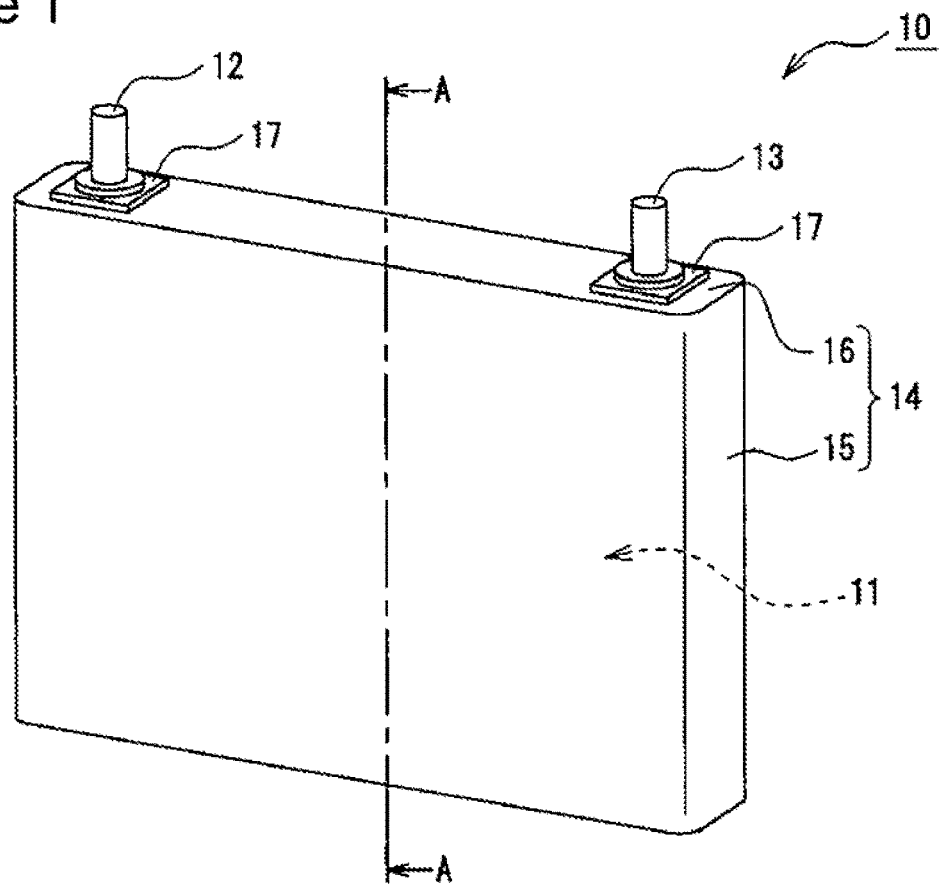
FIG. 1 is a perspective view illustrating the appearance of a nonaqueous electrolyte secondary battery according to an embodiment.
Figure 2:
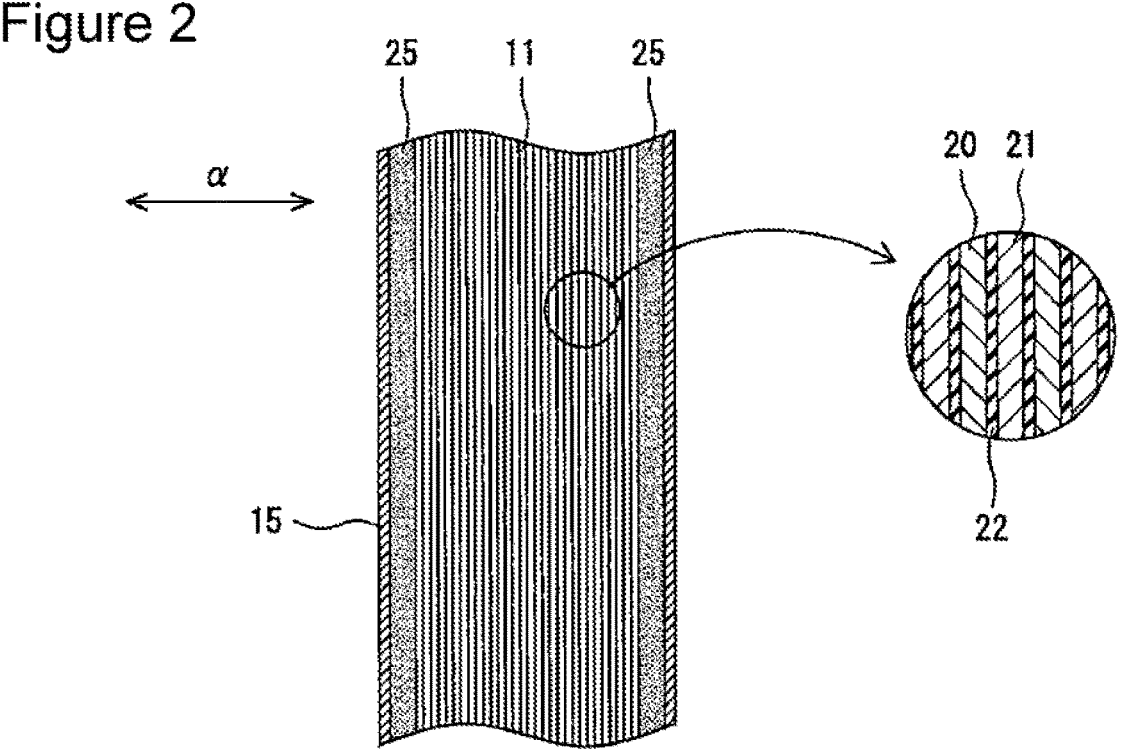
FIG. 2 is a sectional view taken along line A-A in FIG. 1 at 0% SOC.
Figure 3:
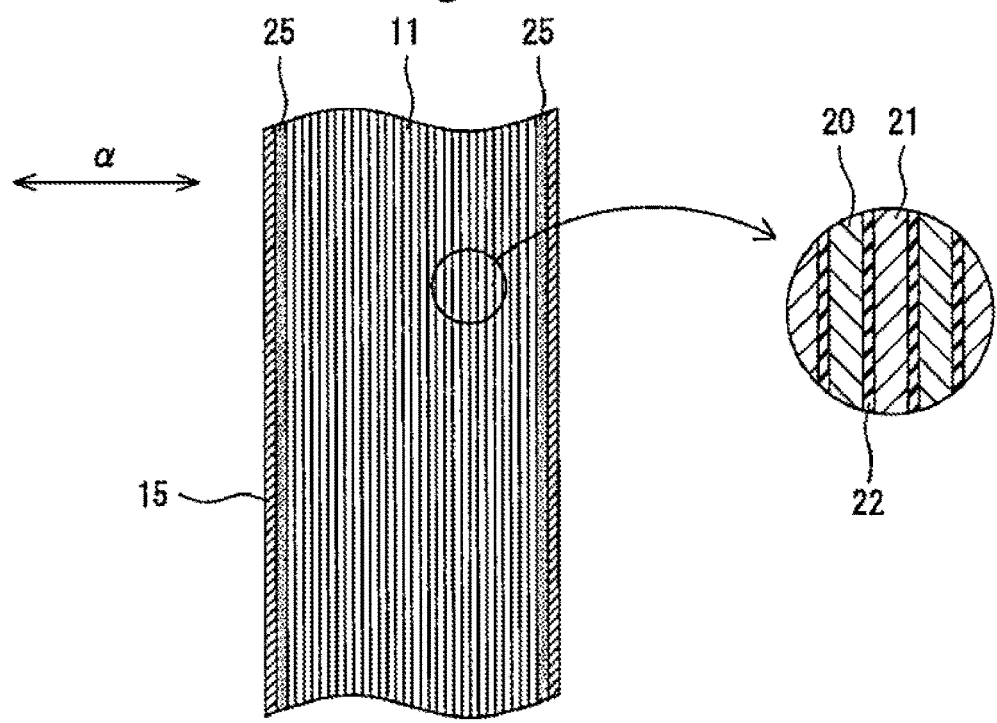
FIG. 3 is a sectional view taken along line A-A in FIG. 1 at 100% SOC.

FIG. 1 is a perspective view illustrating a nonaqueous electrolyte secondary battery 10 according to an embodiment. FIGS. 2 and 3 are sectional views taken along line A-A in FIG. 1 at 0% SOC and 100% SOC, respectively, of the battery. As illustrated in FIGS. 1 to 3, the nonaqueous electrolyte secondary battery 10 includes an electrode assembly 11 and a nonaqueous electrolyte (not shown). The electrode assembly 11 includes a positive electrode 20, a negative electrode 21 and a separator 22, and has a structure in which the positive electrode 20 and the negative electrode 21 are stacked via the separator 22.

In the present embodiment, the electrode assembly 11 includes a plurality of positive electrodes 20, a plurality of negative electrodes 21, and a plurality of separators 22, and has a stack structure in which the positive electrodes 20 and the negative electrodes 21 are alternately stacked via the separators 22. The stack structure may involve a single separator 22 that is continuously Z-folded. The electrode assembly 11 may have a wound structure in which the positive electrode 20 and the negative electrode 21 are wound into a coil via the separator 22.

The nonaqueous electrolyte includes a nonaqueous solvent and an electrolyte salt dissolved in the nonaqueous solvent. Examples of the nonaqueous solvents include esters such as ethylene carbonate (EC), dimethyl carbonate (DMC), methyl ethyl carbonate (EMC) and diethyl carbonate (DEC), ethers such as 1,3-dioxolane, nitriles such as acetonitrile, amides such as dimethylformamide, and mixtures of two or more kinds of these solvents. The nonaqueous solvent may be a halogenated solvent resulting from the substitution of the above solvent with a halogen atom such as fluorine in place of at least part of hydrogen, with examples including fluoroethylene carbonate (FEC) and fluoromethyl propionate (FMP). Examples of the electrolyte salts include lithium salts such as $LiPF_6$.

For example, the nonaqueous electrolyte secondary battery 10 is a lithium ion battery and has a mass energy density of not less than 200 Wh/kg. For example, the mass energy density of the nonaqueous electrolyte secondary battery 10 is 200 Wh/kg to 400 Wh/kg. The mass energy density of the nonaqueous electrolyte secondary battery 10 is calculated by, for example, multiplying the average voltage during discharging at 0.2 C current by the ampacity, and dividing the thus-obtained energy by the battery mass.

The nonaqueous electrolyte secondary battery 10 includes a prismatic battery case 14 in which the electrode assembly 11 and the nonaqueous electrolyte are accommodated. The battery case 14 is being pressed with a predetermined force on both sides thereof in the direction a of stacking of the positive electrodes 20 and the negative electrodes 21 (hereinafter, this direction will be sometimes written simply as "stacking direction $\alpha$"), and thereby the interelectrode distances are maintained constant. In the present embodiment, the pressure to both sides of the battery case in the stacking direction $\alpha$ is realized as a result of a plurality of nonaqueous electrolyte secondary batteries 10 being united into a module (see FIG. 4 discussed later). Incidentally, the electrode assembly 11 expands during charging to produce a stress that pushes the battery case 14 outward, and this stress is resisted by a reaction force generated concurrently therewith.

The nonaqueous electrolyte secondary battery 10 further includes a non-cellular, i.e., being not foamed, elastic sheet 25 disposed between the electrode assembly 11 and the battery case 14. The elastic sheet 25 is elastically deformed concurrently with the volume change of the electrode assembly 11 and appropriately eases the stress produced by the expansion of the electrode assembly 11, thereby keeping the reaction force resisting the stress in an appropriate range. While details will be described later, the ratio (A/B) of the thickness (A) of the elastic sheet 25 at 100% SOC to the thickness (B) of the elastic sheet 25 at 0% SOC is 0.05 to 0.3.

The definitions of the 100% SOC and the 0% SOC vary depending on the types of batteries and other factors. In the present embodiment, the 100% (fully charged) SOC means the charged state with 4.30 V battery voltage, and 0% (fully discharged) SOC means the discharged state with 2.5 V battery voltage.

The battery case 14 is a prismatic metallic case composed of a substantially box-shaped case body 15 and a seal body 16 which covers the opening of the case body 15. The seal body 16 is provided with a positive electrode terminal 12 electrically connected to the respective positive electrodes 20, and a negative electrode terminal 13 electrically connected to the respective negative electrodes 21. To the positive electrode terminal 12, positive electrode lead portions are connected directly or via other conductive members. To the negative electrode terminal 13, negative electrode lead portions are connected directly or via other conductive members. In the following description, for the sake of convenience, the direction in which the positive electrode terminal 12 and the negative electrode terminal 13 are adjacent to each other is defined as the "lateral direction" of components such as the battery case 14, and the direction which is perpendicular to the lateral direction and the stacking direction $\alpha$ is defined as the "vertical direction".

The case body 15 has a flattened shape which has greater lengths in the lateral direction and the vertical direction than in the stacking direction $\alpha$. The case body 15 and the seal body 16 are made of, for example, a metal material based on aluminum. The inner surfaces of these components may be fitted with electrode assembly holders for ensuring insulation. The electrode assembly holders are, for example, 0.05 mm to 0.5 mm thick sheets made of a resin such as polypropylene. For example, the seal body 16 has a substantially rectangular shape that is longer in the lateral direction, and the periphery thereof is welded to the periphery of the open end of the case body 15.

The seal body 16 has through-holes which are not shown on both lateral sides, and the positive electrode terminal 12 and the negative electrode terminal 13 are inserted into the battery case 14 through these holes. For example, the positive electrode terminal 12 and the negative electrode terminal 13 are fixed to the seal body 16 via insulating members 17 arranged at the through-holes. The seal body 16 generally has a gas vent mechanism (not shown).

Figure 4:
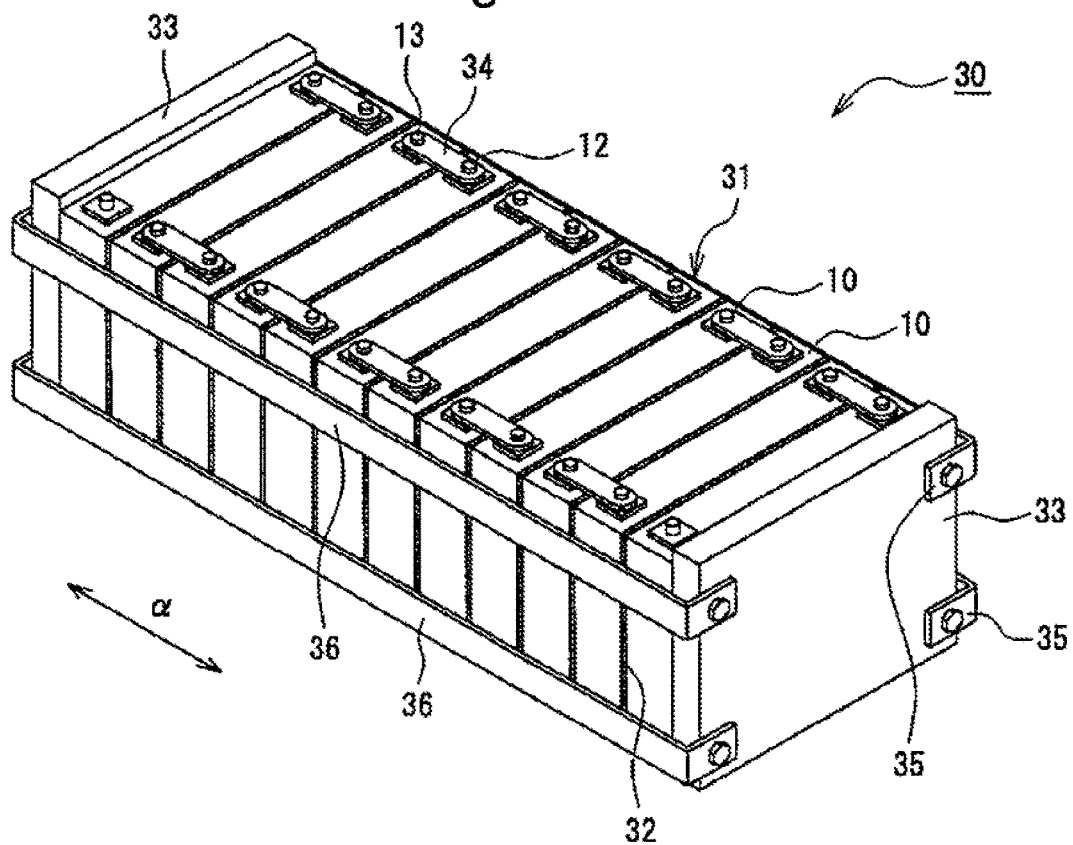
FIG. 4 is a perspective view illustrating a battery module according to an embodiment.

FIG. 4 is a perspective view of a battery module 30 including a plurality of nonaqueous electrolyte secondary batteries 10. As illustrated in FIG. 4, the battery module 30 includes a battery group 31 composed of a plurality of nonaqueous electrolyte secondary batteries 10 adjacent to one another along the stacking direction α, a plurality of spacers 32, and a pair of end plates 33. The spacers 32 are insulating members each disposed between each pair of the nonaqueous electrolyte secondary batteries 10 adjacent to each other. The end plates 33 apply a predetermined force of pressure to the electrode group 31 from both sides in the stacking direction α. The pressure (the predetermined force) applied by the end plates 33 is, for example, 0.1 MPa to 10 MPa.

The battery module 30 includes bind bars 35, 36 which are fixed to the pair of end plates 33 sandwiching the battery group 31 in the stacking direction α (the direction in which the plurality of nonaqueous electrolyte secondary batteries 10 are adjacent to one another) and which bind the batteries of the battery group 31 to one unit. The bind bars 35, 36, in combination with the end plates 33, serve to keep the batteries in the bound condition and to hold the batteries. The bind bars 35 extend along the stacking direction a on one lateral side of the battery group 31, and the bind bars 36 extend along the stacking direction α on the other lateral side of the battery group 31.

In the present embodiment, the nonaqueous electrolyte secondary batteries 10 of the same type are arranged in alternate orientations so that each pair of adjacent batteries will have the positive electrode terminals and the negative electrode terminals each on the opposite sides in the lateral direction. In this case, the positive electrode terminals 12 and the negative electrode terminals 13 are arranged alternately along the stacking direction α. The battery module 30 includes bus bars 34 that electrically connect each pair of nonaqueous electrolyte secondary batteries 10 adjacent to each other. While the nonaqueous electrolyte secondary batteries 10 in the example shown in FIG. 1 are connected in series with the bus bars 34, the manner in which the batteries are connected is not limited thereto.

In the battery module 30, the bind bars 35, 36 are fixed to the pair of end plates 33 so as to press the end plates 33 against the battery group 31, and thereby the nonaqueous electrolyte secondary batteries 10 constituting the battery group 31 are bound together in pressed condition. For example, the end plates 33 are resin plates and are larger than the nonaqueous electrolyte secondary batteries 10. For example, the end plates 33 have bolt holes for fastening the bind bars 35, 36.

In the battery module 30, the spacers 32 disposed between each pair of adjacent nonaqueous electrolyte secondary batteries 10 can absorb a certain amount of volume change of the battery cases 14 due to the charging and discharging of batteries. However, it is difficult to control the reaction force to an appropriate range with the spacers 32 alone. If, for example, use is made of spacers 32 that can be elastically deformed to a great extent like the elastic sheets 25, the batteries will have a significant change in distance between the electrode terminals, and problems may occur in the electrical connections established by the bus bars 34.

Hereinbelow, the configurations of the electrode assembly 11 and the elastic sheet 25 will be further described in detail.

[Positive Electrodes]

The positive electrode 20 includes a positive electrode current collector and a positive electrode mixture layer disposed on the current collector. The positive electrode current collector may be, for example, a foil of a metal that is stable at the potentials of the positive electrode 20, such as aluminum, or a film having such a metal as a skin layer. The positive electrode mixture layer includes a positive electrode active material, a conductive agent and a binder. The positive electrode mixture layer is generally formed on both sides of the positive electrode current collector. For example, the positive electrode 20 may be fabricated by applying a positive electrode mixture slurry including components such as a positive electrode active material, a conductive agent and a binder onto the positive electrode current collector, drying the wet films, and rolling the coatings to form positive electrode mixture layers on both sides of the current collector.

The positive electrode active material is preferably a lithium transition metal oxide. The metal element that constitutes the lithium transition metal oxide is, for example, at least one selected from magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), tungsten (W), lead (Pb) and bismuth (Bi). In particular, the oxide preferably contains at least one selected from Co, Ni, Mn and Al.

Examples of the conductive agents include carbon materials such as carbon black (CB), acetylene black (AB), Ketjen black and graphite. Examples of the binders include fluororesins such as polytetrafluoroethylene (PTFE) and polyvinylidene fluoride (PVdF), polyacrylonitriles (PAN), polyimide resins, acrylic resins and polyolefin resins. These materials may be used singly, or two or more may be used in combination.

[Negative Electrodes]

The negative electrode 21 includes a negative electrode current collector and a negative electrode mixture layer disposed on the current collector. The negative electrode current collector may be, for example, a foil of a metal that is stable at the potentials of the negative electrode 21, such as copper, or a film having such a metal as a skin layer. The negative electrode mixture layer includes a negative electrode active material and a binder. The negative electrode mixture layer is generally formed on both sides of the negative electrode current collector. For example, the negative electrode 21 may be fabricated by applying a negative electrode mixture slurry including components such as a negative electrode active material and a binder onto the negative electrode current collector, drying the wet films, and rolling the coatings to form negative electrode mixture layers on both sides of the current collector.

The negative electrode active material is not particularly limited as long as it can reversibly store and release lithium ions. Examples thereof include carbon materials such as natural graphite and artificial graphite, metals which can be alloyed with lithium such as silicon (Si) and tin (Sn), and alloys and composite oxides containing such metals as Si and Sn. The negative electrode active materials may be used singly, or two or more may be used in combination.

Examples of the binders contained in the negative electrode mixture layers include fluororesins, PAN, polyimide resins, acrylic resins and polyolefin resins, similarly to the case of the positive electrode 20. When the negative electrode mixture slurry is prepared using an aqueous solvent, for example, styrene-butadiene rubber (SBR), carboxymethylcellulose (CMC) or a salt thereof, polyacrylic acid (PAA) or a salt thereof, or polyvinyl alcohol (PVA) may be used.

[Separators]

The separator 22 may be a porous sheet having ion permeability and insulating properties. Specific examples of the porous sheets include microporous thin films, woven fabrics and nonwoven fabrics. Some preferred materials of the separators 22 are olefin resins such as polyethylene, polypropylene, and copolymers including at least one of ethylene and propylene, and celluloses. The separator 22 may be a stack having a cellulose fiber layer and a thermoplastic resin fiber layer such as of olefin resin. The separator 22 may be a multilayer separator including a polyethylene layer and a polypropylene layer, and may have a coating layer including an aramid resin or the like on its surface. A heat resistant layer including an inorganic compound filler may be disposed in the interface(s) between the separator 22 and at least one of the positive electrode 20 and the negative electrode 21.

[Elastic Sheets]

As illustrated in FIGS. 2 and 3, the elastic sheet 25 is preferably arranged in the case body 15 so as to sandwich the electrode assembly 11 from both sides of the electrode assembly in the stacking direction α. As a result of being disposed to sandwich the electrode assembly 11 from both sides thereof in the stacking direction α, the elastic sheet 25 can efficiently absorb the stress generated by the expansion of the electrode assembly 11. The electrode assembly 11 changes its volume during charging and discharging of the battery, and this volume change mainly takes place in the thickness direction. The elastic sheet 25 is elastically deformed to follow the thickness change of the electrode assembly 11, and appropriately eases the stress generated. A single elastic sheet 25 may be folded so as to sandwich the electrode assembly 11. Preferably, each elastic sheet is arranged to each side of the electrode assembly 11 in the stacking direction α. The two elastic sheets 25 are preferably the same as each other.

In the production of the nonaqueous electrolyte secondary battery 10, an electrolytic solution is poured into the case body 15, and the electrode assembly 11 is wet and swollen with the electrolytic solution to generate a stress which pushes the elastic sheets 25. The battery is designed so that, before the wet swelling of the electrode assembly 11, the total of the thickness of the two elastic sheets 25 and the thickness (the length along the stacking direction a) of the electrode assembly 11 is smaller than the inner size (Y) of the case body 15 along the stacking direction a. This design allows the electrode assembly 11 sandwiched between the two elastic sheets 25 to be inserted into the battery case 14. Hereinafter, unless otherwise mentioned, the inner size of the battery case 14 (the case body 15) means the inner size along the stacking direction α. When electrode assembly holders are fitted to the battery case 14, the inner size between the electrode assembly holders along the stacking direction α is defined as the inner size of the battery case 14. The electrode assembly holders may also serve as the elastic sheets 25.

The elastic sheet 25 is preferably such that the ratio (X/Y) of the sheet thickness (X) to the inner size (Y) of the battery case 14 (the case body 15) is 0.03 to 0.07. The thickness (X) of the elastic sheet 25 is the thickness in the initial state and is substantially equal to the thickness of the sheet removed from the battery case 14 to gain the original shape. Where the elastic sheets 25 are arranged on both sides of the electrode assembly 11 in the stacking direction α, the thickness (X) is the total thickness of the two sheets. When the ratio (X/Y) is in the above range, high capacity and good reaction force controllability may be easily attained at the same time. The thickness of one elastic sheet 25 is, for example, 0.4 mm to 0.8 mm.

The elastic sheets 25 are larger than the positive electrodes 20 and the negative electrodes 21 constituting the electrode assembly 11. Preferably, the elastic sheets 25 perfectly overlap with the positive electrodes 20 and the negative electrodes 21 in the stacking direction α. That is, the positive electrodes 20 and the negative electrodes 21 do not extend beyond the upper, lower, right and left ends of the elastic sheets 25. In this case, the elastic sheets can efficiently absorb the generated stress without causing a strain, a damage or the like to the electrode assembly 11.

In the elastic sheet 25, the ratio (A/B) of the thickness (A) at 100% SOC to the thickness (B) at 0% SOC is 0.05 to 0.3. Specifically, when the nonaqueous electrolyte secondary battery 10 is charged from 0% SOC to 100% SOC, the thickness of the elastic sheet 25 decreases by at least 70% and is reduced by 95% at maximum. The thickness ratio (A/B) may be, for example, 0.05 to 0.29, or 0.05 to 0.28. A preferred range of the thickness ratio (A/B) is 0.15 to 0.30.

By virtue of the elastic sheet 25 being capable of changing the thickness in the above controlled manner in accordance with the SOC, the reaction force exerted on the electrode assembly 11 can be maintained in an appropriate range in the fully charged state and also in the fully discharged state. In this manner, the occurrence of problems stemming from too high or too low reaction force can be prevented, and good battery performance can be ensured. The appropriate range of the reaction force is, for example, from 0.2 MPa to 2.0 MPa, and is preferably from 0.4 MPa to 1.8 MPa. For example, the thicknesses (A and B) of the elastic sheet 25 may be determined with a laser displacement meter or may be calculated based on measurement with a universal tester.

The elastic modulus of the elastic sheet 25 is preferably 0.5 MPa to 2.0 MPa, more preferably 0.7 MPa to 1.7 MPa, and particularly preferably 0.9 MPa to 1.5 MPa. When the elastic modulus of the elastic sheet 25 is in this range, the reaction force can be easily maintained in an appropriate range. The elastic modulus in the present specification is the compressive elastic modulus. The elastic modulus of the elastic sheet 25 is measured by a method in accordance with JIS K6272.

The material of the elastic sheet 25 is not particularly limited. Preferably, the elastic sheet 25 is made of a resin which satisfies the above elastic modulus, is elastically deformed to follow the thickness change of the electrode assembly 11, and has a high resistance to electrolytic solutions. Examples of the resins for forming the elastic sheets 25 include pure rubbers such as chloroprene rubber, silicone rubber, acrylonitrile butadiene rubber, styrene butadiene rubber, butadiene rubber, butyl rubber and ethylene propylene rubber, and compounded rubbers of these rubbers.

As already described, the elastic sheet 25 is a non-cellular sheet which preferably does not substantially absorb an electrolytic solution. For example, the elastic sheet 25 is a nonporous sheet free from 10 μm and larger pores. The elastic sheet 25 preferably absorbs the solvent of the nonaqueous electrolyte in a mass ratio of less than 5% relative to the mass of the sheet. This absorption ratio is particularly preferably less than 1%. Such an elastic sheet 25 with low absorption ratio exhibits good deformation response even in the case where a high-viscosity electrolytic solution is used, and the reaction force may be easily maintained in an appropriate range. The absorption ratio of the elastic sheet 25 with respect to the electrolytic solution may be determined by soaking a test piece of the elastic sheet in the electrolytic solution for a predetermined amount of time, and measuring the mass change.

EXAMPLES

Hereinbelow, the present disclosure will be further described based on EXAMPLES. However, it should be construed that the scope of the present disclosure is not limited to such EXAMPLES.

Example 1

[Fabrication of Positive Electrode]

A positive electrode mixture slurry was prepared by mixing 97 parts by mass of lithium transition metal oxide $LiNi_{0.55}Co_{0.20}Mn_{0.25}O_2$ as a positive electrode active material, 2 parts by mass of acetylene black (AB) and 1 part by mass of polyvinylidene fluoride (PVdF), and adding an appropriate amount of N-methyl-2-pyrrolidone (NMP) to the mixture. Next, the positive electrode mixture slurry was applied to both sides of an aluminum foil as a positive electrode current collector. The wet films were dried and rolled with a roller. The sheet was then cut to a predetermined electrode size. Thus, a positive electrode was fabricated which had the positive electrode mixture layers on both sides of the positive electrode current collector.

[Fabrication of Negative Electrode]

A negative electrode mixture slurry was prepared by mixing 98.7 parts by mass of graphite powder, 0.7 parts by mass of carboxymethylcellulose (CMC) and 0.6 parts by mass of styrene-butadiene rubber (SBR), and adding an appropriate amount of water to the mixture. Next, the negative electrode mixture slurry was applied to both sides of a copper foil as a negative electrode current collector. The wet films were dried and rolled with a roller. The sheet was then cut to a predetermined electrode size. Thus, a negative electrode was fabricated which had the negative electrode mixture layers on both sides of the negative electrode current collector.

[Preparation of Nonaqueous Electrolytic Solution]

Ethylene carbonate (EC), methyl ethyl carbonate (EMC) and dimethyl carbonate (DMC) were mixed in a volume ratio of 3:3:4. $LiPF_6$ was dissolved with a concentration of 1.2 mol/L into the above mixed solvent. A nonaqueous electrolytic solution was thus prepared.

[Fabrication of Test Cell and Test Module]

The positive electrodes and the negative electrodes fabricated as described above were stacked alternately on top of one another via polyethylene separators. A stacked electrode assembly was thus fabricated. The thickness (the length in the stacking direction) of the electrode assembly was 22.8 mm. A battery case (a case body) was provided for the accommodation of the electrode assembly. This battery case was 24.8 mm in inner size and 24.5 mm in distance between electrode assembly holders. Next, two elastic sheets S1 having a thickness of 0.47 mm and an elastic modulus of 1.5 MPa were arranged to both sides of the electrode assembly in the stacking direction α so as to sandwich the electrode assembly. The elastic sheets and the electrode assembly were then placed into the substantially box-shaped case body. The nonaqueous electrolytic solution was poured into the case body in the absence of water while pressing the cell from both sides in the stacking direction. During this process, the electrode assembly adsorbed the electrolytic solution and was swollen to bring the elastic sheets into contact with the inner wall of the case body. A stress and a reaction force were thus generated. Next, lead portions of the respective electrodes were connected to a positive electrode terminal and a negative electrode terminal disposed on a seal body. The open end of the case body was closed with the seal body. A prismatic test cell was thus fabricated. A test module having such test cells was also fabricated. The mass energy density of the test cell was 273 Wh/kg.

The elastic sheets S1 accommodated in the battery case were non-cellular resin sheets based on chloroprene rubber. The amount of the electrolytic solution adsorbed was measured as described hereinabove to be less than 1%. The ratio of the thickness of the two elastic sheets S1 to the inner size of the case body in the stacking direction α was 0.038.

Examples 2 to 4 and Comparative Examples 1 to 4

Prismatic cells were fabricated in the same manner as in EXAMPLE 1, except that the elastic sheets S1 were replaced by elastic sheets having a thickness and an elastic modulus described in Table 1.

The test cells of EXAMPLES and COMPARATIVE EXAMPLES were tested by the following method to determine the reaction force at 0% SOC (the minimum reaction force) and the reaction force at 100% SOC (the maximum reaction force). The measurement results are described in Table 1 together with the thicknesses and elastic moduli of the elastic sheets. Good battery performance is obtained when the minimum reaction force is 0.2 MPa or above and the maximum reaction force is 2.0 MPa or less.

[Measurement of Reaction Force]

The test cell was held between two SUS plates (140×75 mm), and a load displacement curve was obtained using universal tester AG-X plus (SHIMADZU). The load that was reached when the thickness was equal to the thickness of the case body (26.5 mm) was obtained as the reaction force. The test cell after initial capacity measurement was discharged, and the reaction force was measured. Next, the test cell was charged to 100% SOC, and a load displacement curve was obtained in the similar manner.

The charging and discharging conditions were as follows.

The cell was charged at a constant current of ⅓ It (21.5 A) to 4.25 V, and was charged at the constant voltage to 3 A.

The cell was discharged at a constant current of ⅓ It (21.5 A) to 2.5 V.

TABLE 1

|  | EX. 1 | EX. 2 | EX. 3 | COMP. EX. 1 | COMP. EX. 2 | COMP. EX. 3 | COMP. EX. 4 | COMP. EX. 5 |
|---|---|---|---|---|---|---|---|---|
| Ratio of elastic sheet thicknesses (SOC 100/0) | 0.27 | 0.17 | 0.05 | 0.80 | 0.67 | 0.60 | 0.50 | 0.03 |
| Elastic sheet thickness/ case inner size | 0.038 | 0.044 | 0.059 | 0.048 | 0.049 | 0.071 | 0.052 | 0.016 |

TABLE 1-continued

| | EX. 1 | EX. 2 | EX. 3 | COMP. EX. 1 | COMP. EX. 2 | COMP. EX. 3 | COMP. EX. 4 | COMP. EX. 5 |
|---|---|---|---|---|---|---|---|---|
| Elastic modulus (MPa) of elastic sheets | 1.5 | 1.2 | 0.9 | 7.8 | 4.1 | 3.0 | 2.4 | 1.3 |
| Minimum reaction force (MPa) | 0.5 | 0.5 | 0.5 | 1.3 | 1.1 | 1.3 | 0.9 | 0.1 |
| Maximum reaction force (MPa) | 1.7 | 1.5 | 1.4 | 2.8 | 2.5 | 2.5 | 2.1 | 1.4 |
| ΔReaction force (MPa) | 1.1 | 1.0 | 0.9 | 1.6 | 1.4 | 1.2 | 1.2 | 1.3 |

As shown in Table 1, all the test cells of EXAMPLES attained a minimum reaction force of not less than 0.2 MPa and a maximum reaction force of not more than 2.0 MPa. The test cells of COMPARATIVE EXAMPLES 1 to 4 received a minimum reaction force of not less than 0.2 MPa, but their maximum reaction forces were more than 2.0 MPa.

The test cell of COMPARATIVE EXAMPLE 5 attained a maximum reaction force of not more than 2.0 MPa, but had a minimum reaction force of below 0.2 MPa. It has been thus demonstrated that the reaction force can be maintained in an appropriate range only when the ratio (A/B) of the thickness (A) of the elastic sheet at 100% SOC to the thickness (B) of the elastic sheet at 0% SOC is 0.05 to 0.3.

REFERENCE SIGNS LIST

10 NONAQUEOUS ELECTROLYTE SECONDARY BATTERY
11 ELECTRODE ASSEMBLY
12 POSITIVE ELECTRODE TERMINAL
13 NEGATIVE ELECTRODE TERMINAL
14 BATTERY CASE
15 CASE BODY
16 SEAL BODY
17 INSULATING MEMBER
20 POSITIVE ELECTRODE
21 NEGATIVE ELECTRODE
22 SEPARATOR
25 ELASTIC SHEET
30 BATTERY MODULE
31 BATTERY GROUP
32 SPACER
33 END PLATE
34 BUS BAR
35, 36 BIND BAR

The invention claimed is:

1. A nonaqueous electrolyte secondary battery comprising:
an electrode assembly including a positive electrode, a negative electrode and a separator, the positive electrode and the negative electrode being stacked together via the separator,
a nonaqueous electrolyte, and
a prismatic battery case accommodating the electrode assembly and the nonaqueous electrolyte,
the mass energy density of the nonaqueous electrolyte secondary battery being not less than 200 Wh/kg,
the nonaqueous electrolyte secondary battery further comprising a non-cellular elastic sheet disposed between the electrode assembly and the battery case,
the ratio (A/B) of the thickness (A) of the elastic sheet at 100% SOC to the thickness (B) of the elastic sheet at 0% SOC being 0.05 to 0.3.

2. The nonaqueous electrolyte secondary battery according to claim 1, wherein the battery case is being pressed on both sides thereof in the direction of stacking of the positive electrode and the negative electrode.

3. The nonaqueous electrolyte secondary battery according to claim 1, wherein the elastic sheet is arranged so as to sandwich the electrode assembly from both sides of the electrode assembly in the direction of stacking of the positive electrode and the negative electrode.

4. The nonaqueous electrolyte secondary battery according to claim 1, wherein the elastic modulus of the elastic sheet is 0.9 MPa to 1.5 MPa.

5. The nonaqueous electrolyte secondary battery according to claim 1, wherein the ratio (X/Y) of the thickness (X) of the elastic sheet to the inner size (Y) of the battery case along the direction of stacking of the positive electrode and the negative electrode is 0.03 to 0.07.

6. The nonaqueous electrolyte secondary battery according to claim 1, wherein the absorption ratio of the elastic sheet with respect to a solvent in the nonaqueous electrolyte is less than 5% relative to the mass of the sheet.

7. The nonaqueous electrolyte secondary battery according to claim 1, wherein the electrode assembly includes a plurality of the positive electrodes and a plurality of the negative electrodes, and has a structure in which the positive electrodes and the negative electrodes are alternately stacked via the separator.

8. A battery module comprising:
a battery group including a plurality of the nonaqueous electrolyte secondary batteries of claim 1 arranged along the direction of stacking of the positive electrode and the negative electrode,
a plurality of spacers each disposed between each pair of the nonaqueous electrolyte secondary batteries adjacent to each other, and
a pair of end plates that applies a pressure to the battery group from both sides of the battery group in the direction of stacking of the positive electrode and the negative electrode.

* * * * *